US012187895B2

(12) United States Patent
Delville et al.

(10) Patent No.: US 12,187,895 B2
(45) Date of Patent: *Jan. 7, 2025

(54) RUBBER COMPOSITION AND A TIRE

(71) Applicant: The Goodyear Tire & Rubber Company, Akron, OH (US)

(72) Inventors: Jerome Joel Daniel Delville, Rehon (FR); Carlo Kanz, Mamer (LU); Pascal Patrick Steiner, Vichten (LU); Marie-Laure Stephanie Milan, Strassen (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/807,493

(22) Filed: Jun. 17, 2022

(65) Prior Publication Data
US 2023/0082511 A1 Mar. 16, 2023

Related U.S. Application Data

(60) Provisional application No. 63/237,316, filed on Aug. 26, 2021.

(51) Int. Cl.
*C08L 9/06* (2006.01)
*B60C 1/00* (2006.01)

(52) U.S. Cl.
CPC .............. *C08L 9/06* (2013.01); *B60C 1/0016* (2013.01); *C08L 2205/025* (2013.01); *C08L 2205/035* (2013.01)

(58) Field of Classification Search
CPC .......... C08L 9/06; C08L 7/00; C08L 2205/02; C08L 2205/025
See application file for complete search history.

(56) References Cited

U.S. PATENT DOCUMENTS

| | | | |
|---|---|---|---|
| 8,450,424 B2* | 5/2013 | Koelle | C08L 19/006 525/194 |
| 9,441,098 B1 | 9/2016 | Isitman et al. | |
| 9,757,987 B2 | 9/2017 | Jacoby et al. | |
| 9,873,780 B1 | 1/2018 | Sandstrom | |
| 10,279,626 B2 | 5/2019 | Isitman | |
| 10,364,342 B2 | 7/2019 | Brace | |
| 10,519,300 B2 | 12/2019 | Brace | |
| 10,618,352 B2 | 4/2020 | Broemmel et al. | |
| 10,626,254 B1 | 4/2020 | Delville et al. | |
| 10,654,995 B2 | 5/2020 | Mejia et al. | |
| 10,821,777 B2 | 11/2020 | Isitman et al. | |
| 11,827,791 B2* | 11/2023 | Picard | B60C 1/0016 |
| 2013/0338256 A1 | 12/2013 | Steiner et al. | |
| 2014/0371346 A1* | 12/2014 | Saintigny | C08K 5/0016 523/156 |
| 2016/0376427 A1 | 12/2016 | Sandstrom et al. | |
| 2017/0037225 A1 | 2/2017 | Isitman et al. | |
| 2017/0051135 A1 | 2/2017 | Sandstrom et al. | |
| 2017/0166732 A1 | 6/2017 | Isitman et al. | |
| 2017/0232795 A1 | 8/2017 | Isitman et al. | |
| 2018/0154696 A1 | 6/2018 | Isitman et al. | |
| 2019/0062537 A1 | 2/2019 | Mejia et al. | |
| 2019/0225778 A1 | 7/2019 | Weydert et al. | |
| 2019/0330452 A1 | 10/2019 | Isitman et al. | |
| 2020/0071506 A1* | 3/2020 | Steiner | C08L 9/06 |
| 2020/0087489 A1 | 3/2020 | Isitman | |
| 2020/0094623 A1 | 3/2020 | Isitman | |
| 2020/0231787 A1 | 7/2020 | Brace | |
| 2021/0024739 A1 | 1/2021 | Jacoby | |
| 2021/0087370 A1* | 3/2021 | Labrunie | B60C 11/0008 |
| 2021/0402827 A1 | 12/2021 | Jacoby et al. | |
| 2022/0089844 A1 | 3/2022 | Engeldinger et al. | |
| 2022/0145063 A1 | 5/2022 | Gersman et al. | |

FOREIGN PATENT DOCUMENTS

EP 2455232 B1 8/2013

OTHER PUBLICATIONS

Extended European Search Report for Application No. 22191716.4, dated Jan. 31, 2023.
Chinese Office Action for Application No. 202211032304.7, dated Aug. 17, 2023.

* cited by examiner

Primary Examiner — Brieann R Johnston
(74) Attorney, Agent, or Firm — Mandy B. Willis

(57) ABSTRACT

In a first aspect, the present invention is directed to a rubber composition comprising 70 phr to 95 phr of styrene butadiene rubber comprising at least 5 phr of a first styrene butadiene rubber having a glass transition temperature within a range of −49° C. to −15° C. and at least 45 phr of a second styrene butadiene rubber having a glass transition temperature within a range of −50° C. to −89° C., wherein the rubber composition comprises more of the second styrene butadiene rubber than of the first styrene butadiene rubber. Moreover, the rubber composition comprises 5 phr to 30 phr of one or more of natural rubber and synthetic polyisoprene; 135 phr to 200 phr of silica; and at least 55 phr of at least one hydrocarbon resin comprising at least one terpene resin having a glass transition temperature of at least 30° C.

18 Claims, 1 Drawing Sheet

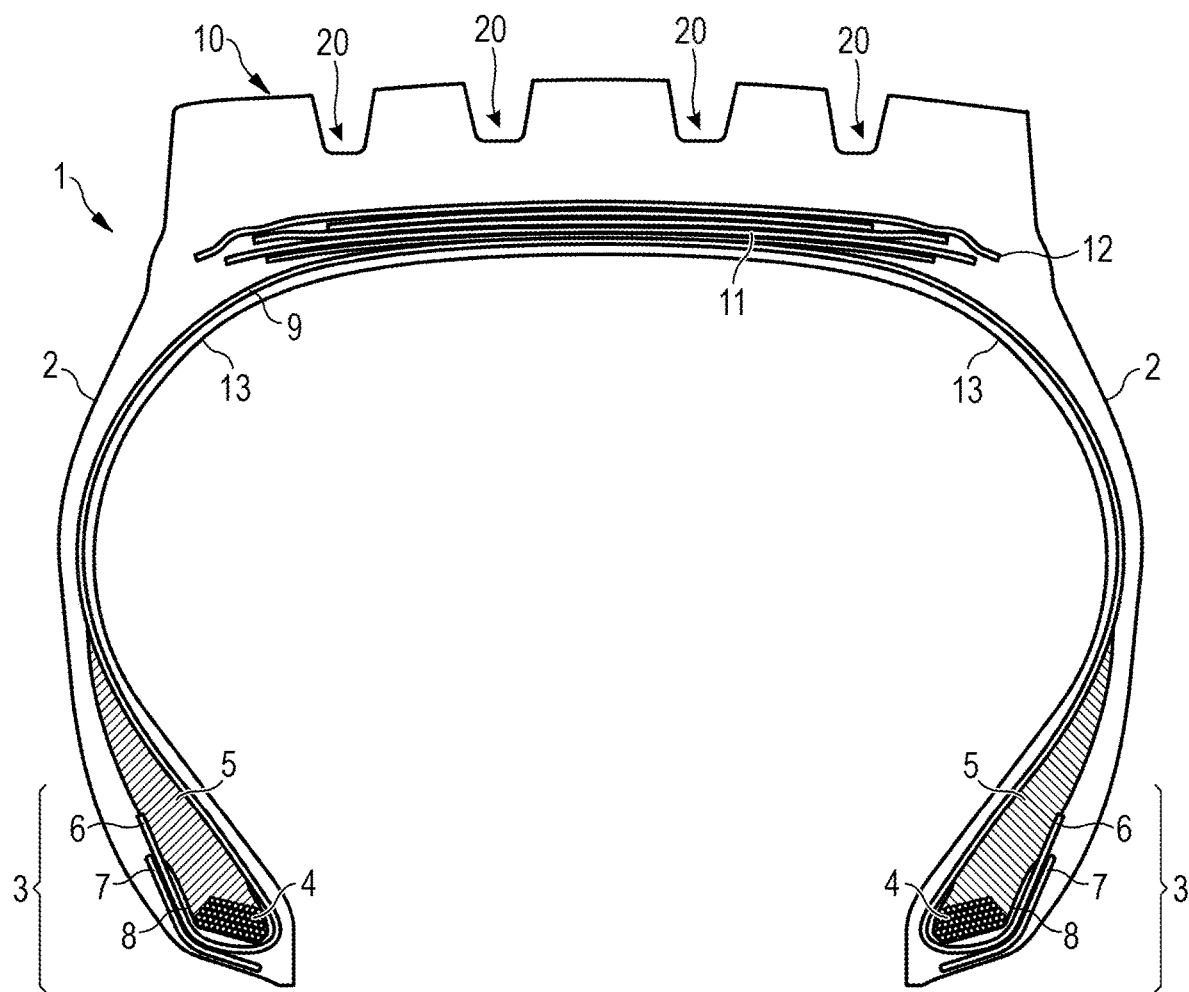

RUBBER COMPOSITION AND A TIRE

FIELD OF THE INVENTION

The present invention is directed to a rubber composition, in particular a tread rubber composition. Moreover, the present invention is directed to a tire comprising such a rubber composition, in particular a tire having a tread with said rubber composition.

BACKGROUND

As known in the tire art, it has traditionally been difficult to improve multiple tire characteristics at the same time without considerable trade-offs in at least another tire characteristic. One of such conflicts exists between rolling resistance and wet performance. For instance, in cases where rolling resistance is improved it is typically detrimental to the wet grip performance characteristics of the tire. However, limiting rolling resistance is crucial to increase energy efficiency. Moreover, it is also desirable to limit treadwear in order to improve sustainability and reduce costs for the vehicle owner by extending the service life of the tire.

Despite significant developments in tire compound technology, significant room for improvement in the balance between the above described properties remains.

SUMMARY OF THE INVENTION

A first object of the invention may be to provide a rubber composition allowing for improved rolling resistance and good wet performance, in particular wet braking.

Another object of the present invention may be to provide a rubber composition with an advanced balance between rolling resistance, wet performance, and optionally tread wear.

The present invention is defined by the scope of the independent claims. Preferred embodiments are provided in the dependent claims as well as in the summary of the invention herein below.

In a first aspect of the invention, the present invention is directed to a rubber composition comprising 70 phr to 95 phr of styrene butadiene rubber comprising at least 5 phr of a first styrene butadiene rubber having a glass transition temperature within a range of −49° C. to −15° C. and at least 45 phr of a second styrene butadiene rubber having a glass transition temperature within a range of −50° C. to −89° C. The rubber composition comprises more of the second styrene butadiene rubber than of the first styrene butadiene rubber (in other words predominantly the second styrene butadiene rubber). Furthermore, the rubber composition comprises 5 phr to 30 phr of one or more of natural rubber and synthetic polyisoprene, 135 phr to 200 phr of silica, and at least 55 phr of at least one hydrocarbon resin comprising at least one terpene resin having a glass transition temperature of at least 30° C.

It has been discovered by the inventors that the combination of a rubber matrix comprising a high glass transition temperature styrene butadiene rubber, a low glass transition temperature styrene butadiene rubber, an isoprenic rubber and said high load of resin with high glass transition temperature in a highly silica filled compound, can provide an advanced balance between wet performance, rolling resistance and abrasion.

In one embodiment, the rubber composition comprises at least 60 phr of the one or more hydrocarbon resins, and preferably at most 90 phr of the one or more hydrocarbon resins.

In another embodiment, the rubber composition comprises at least 50 phr, preferably at least 55 phr or yet more preferably at least 60 phr or at least 62 phr of the terpene resin. Preferably, the rubber composition comprises less than 90 phr of the terpene resin, in particular preferably less than 80 phr of the terpene resin.

In another embodiment, the rubber composition comprises at least 20 phr of the terpene resin and at least 30 phr of a C5 resin, wherein one or both of the resins are optionally C9 modified.

In still another embodiment, the terpene resin is an alpha pinene based terpene resin or, in other words, a terpene resin based on alpha pinenes. In particular, terpene phenol resins have been found to be less preferable.

In still another embodiment, said terpene resin has one or more of: i) a softening point within a range of 100° C. to 150° C., ii) a glass transition temperature within a range of 35° C. to 90° C., preferably from 35° C. to 80° C., or even more preferably from 50° C. to 80° C., and iii) a weight average molecular weight (Mw) within a range of 500 g/mol to 1000 g/mol.

In yet another embodiment, the terpene resin is one or more of i) non-hydrogenated, and ii) free of aromatic/C9 modifications.

In still another embodiment, the rubber composition comprises from 140 phr (preferably from 145 phr) to 200 phr (preferably to 190 phr) of the silica.

In yet another embodiment, the silica comprises a BET surface area within a range of 150 $m^2/g$ to 220 $m^2/g$, preferably within a range of 150 $m^2/g$ to 190 $m^2/g$. Such a range may be particularly preferable in combination with a high silica load. In particular, the inventors have found that higher surface area silicas are less desirable in the present composition.

In yet another embodiment, one or both of the first and the second styrene butadiene rubbers are solution polymerized styrene butadiene rubbers.

In still another embodiment, the second styrene butadiene rubber has a glass transition temperature higher than −80° C., or higher than −78° C., or higher than −75° C., or higher than −70° C. or higher than −68° C. Preferably that glass transition temperature may be lower than −55° C., or preferably lower than −60° C.

In still another embodiment, the rubber composition further comprises one or more of:
- from 0.1 phr to 10 phr of carbon black, preferably from 0.2 phr to 5 phr carbon black;
- from 10 phr to 20 phr of silane;
- from 10 phr to 20 phr of a blocked mercapto silane; and
- from 0 phr to 9 phr of liquid plasticizers, preferably from 0 to 6 phr of liquid plasticizers (such as oils, liquid diene-based polymers or liquid resins, wherein liquid means liquid at
- a temperature of 23° C.). Higher liquid plasticizer loads are not desired in this embodiment.

In still another embodiment, the rubber composition comprises from 8 phf (defined as parts per hundred parts of total filler, all by weight, and defined as known to the person skilled in the art) to 15 phf of a blocked mercapto silane. In particular, the rubber composition may comprise from 10 phr to 20 phr of a blocked mercapto silane, such as 3-octanoylthio-1-propyltriethoxysilane.

In still another embodiment, the rubber composition comprises from 1 phr to 7 phr of oil, having preferably a glass transition temperature below −75° C., preferably within a range of −75° C. to −99° C., or −78° C. to −90° C.

Preferably, said oil is at least one vegetable oil, even more preferably sunflower oil or one or more vegetable oils as listed subsequently herein.

In yet another embodiment, both of the first styrene butadiene rubber and the second styrene butadiene rubber comprise at least one functional group configured for coupling to the silica. Preferably, both styrene butadiene rubbers have at least one functional group configured for coupling to silica. Preferably, these functional groups are provided at the chain ends if the rubber.

In still another embodiment, one of the first styrene butadiene rubber and the second styrene butadiene rubber is end chain functionalized with an amino silane group on at least one of its ends, and the other one of the first styrene butadiene rubber and the second styrene butadiene rubber is end chain functionalized on at least one of its ends with an amino siloxane group.

In still another embodiment, the first styrene butadiene rubber has a glass transition temperature which is within a range of –20° C. to –40° C. and the second styrene butadiene rubber has a glass transition temperature within a range of –55° C. to –69° C.

In yet another embodiment, the glass transition temperature of the rubber composition is within a range of –25° C. and –15° C. Preferably, the glass transition temperature of the rubber composition is within a range of –25° C. and –20° C. This relatively low glass transition temperature range facilitates good performance at low temperatures.

In yet another embodiment, said styrene butadiene rubber comprises at least 20 phr more of the second styrene butadiene rubber than of the first styrene butadiene rubber, and at least 8 phr, or preferably at least 10 phr, of the first styrene butadiene rubber; and/or the rubber composition comprises from 5 phr to 20 phr of the first styrene butadiene rubber and from 45 phr to 80 phr of the second styrene butadiene rubber.

In still another embodiment, the rubber composition comprises from 15 phr to 30 phr of natural rubber and/or synthetic polyisoprene (such as 1,4- and/or 3,4-polyisoprene), preferably predominantly or entirely natural rubber.

In still another embodiment, one of the first styrene butadiene rubber and the second styrene butadiene rubber is end-chain-functionalized with an amino silane group (on at least one of its chain ends, optionally at both chain ends), and wherein the other one of the first styrene butadiene rubber and the second styrene butadiene rubber is end-chain-functionalized with an amino siloxane group (on at least one of its chain ends, optionally at both chain ends).

In still another embodiment, the first styrene butadiene rubber has a bound styrene content within a range of 5% to 50%, preferably 15% to 35%, and most preferably 20% to 35%; and/or the second styrene butadiene rubber has a bound styrene content within a range of 5% to 30%, preferably 10% to 19%.

In an embodiment, the rubber composition may include an additional diene-based rubber. Representative synthetic polymers may be the homopolymerization products of 1,3-butadiene and its homologues and derivatives, for example, methylbutadiene, dimethylbutadiene and pentadiene as well as copolymers such as those formed from 1,3-butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubber or elastomers may be in general natural rubber, synthetic polyisoprene rubber, polybutadiene rubber, and SBR including solution styrene butadiene rubber (SSBR).

In another embodiment, an emulsion polymerization derived styrene butadiene ribber (ESBR) might be used having a bound styrene content of 20 to 28 percent or, for some applications, an ESBR having a medium to relatively high bound styrene content, namely, a bound styrene content of 30 to 45 percent. In many cases the ESBR will have a bound styrene content which is within the range of 26 to 31 percent. By emulsion polymerization prepared ESBR, it may be meant that styrene and 1,3-butadiene are copolymerized as an aqueous emulsion. ESBR is well known to those skilled in the art. The bound styrene content can vary, for example, from 5 to 50 percent. In one aspect, the ESBR may also contain acrylonitrile to form a terpolymer rubber, as ESBAR, in amounts, for example, of 2 to 30 weight percent bound acrylonitrile in the terpolymer. Emulsion polymerization prepared styrene/butadiene/acrylonitrile copolymer rubbers containing 2 to 40 weight percent bound acrylonitrile in the copolymer may also be contemplated as diene-based rubbers.

In another embodiment, solution polymerization prepared (or solution polymerized) SBR (SSBR) is used. Such an SSBR, e.g. according to the above embodiments, can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator. In still another embodiment, the solution styrene butadiene rubber is a tin-coupled polymer. In still another embodiment, the SSBR is functionalized for improved compatibility with silica. In addition, or alternatively, the SSBR is thio-functionalized. This helps to improve stiffness of the compound and/or its hysteresis behavior. Thus, for instance, the SSBR may be a thio-functionalized, tin-coupled solution polymerized copolymer of butadiene and styrene.

In one embodiment, a synthetic or natural polyisoprene rubber is used. Synthetic cis-1,4-polyisoprene and natural rubber are as such well known to those having skill in the rubber art. In particular, the cis-1,4-microstructure content may be at least 90% and is typically at least 95% or even higher.

In one embodiment, cis-1,4-polybutadiene rubber (BR or PBD) is additionally used. Suitable polybutadiene rubbers may be prepared, for example, by organic solution polymerization of 1,3-butadiene. The BR may be conveniently characterized, for example, by having at least a 90 percent cis-1,4-microstructure content ("high cis" content) and a glass transition temperature (Tg) in a range of from −95 to −110° C. Suitable high cis-polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference. Alternatively, the compound is essentially free or completely free of PBD.

A glass transition temperature, or Tg, of an elastomer or elastomer composition, where referred to herein, represents the glass transition temperature(s) of the respective elastomer or elastomer composition in its uncured state or in a cured state in the case of an elastomer composition. A Tg is determined herein as a peak midpoint by a differential scanning calorimeter (DSC) at a temperature rate of increase of 10° C. per minute, according to ASTM D3418.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 phr to 5 phr, of one or more additional diene-based rubbers, such as SBR, SSBR, ESBR, PBD/BR, NR and/or synthetic polyisoprene. In another example, the composition may include less than 5 phr, preferably less than 3 phr, of an additional diene-based rubber or be also essentially free of such an additional diene-based rubber. The terms "compound", "composition" and "formulation" may be used herein interchangeably, unless indicated otherwise.

In another embodiment, the rubber composition includes one or more resins, preferably having a glass transition temperature Tg greater than 35° C., preferably greater than 40° C. in accordance with another embodiment of the present invention. A Tg for resins is determined as a peak midpoint by a differential scanning calorimeter (DSC) at a temperature rate of increase of 10° C. per minute, according to ASTM D6604 or equivalent. Preferably, the resin has a softening point above 100° C. as determined by ASTM E28 which might sometimes be referred to as a ring and ball softening point.

Terpene resins are preferably comprised of polymers of at least one of limonene, alpha pinene, beta pinene and delta-3-carene, whereas terpene-phenol resins may be derived by copolymerization of phenolic monomers with terpenes, such as limonenes, pinenes and delta carene.

In an embodiment, the rubber composition may also include oil, in particular processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Some representative examples of vegetable oils that can be used include soybean oil, sunflower oil, canola (rapeseed) oil, corn oil, coconut oil, cottonseed oil, olive oil, palm oil, peanut oil, and safflower oil. Soybean oil, sunflower seed oil, and corn oil are typically preferred vegetable oils. If used, the rubber composition preferably includes less than 10 phr of oil.

In an embodiment, the rubber composition includes silica. Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g. sodium silicate. Such conventional silicas might be characterized, for example, by having a BET surface area, as measured using nitrogen gas. In one embodiment, the BET surface area may be in the range of 40 to 600 square meters per gram. In another embodiment, the BET surface area may be in a range of 50 to 300 square meters per gram. In the embodiments of the present invention, said surface area is preferably relatively high. The BET surface area is determined according to ASTM D6556 or equivalent and is described in the Journal of the American Chemical Society, Volume 60, Page 304 (1930).

In still another embodiment, the rubber composition may comprise pre-silanized and precipitated silica. In another embodiment, pre-silanized, or in other words pre-hydrophobated, precipitated silica utilized is hydrophobated prior to its addition to the rubber composition by treatment with at least one silane. Suitable silanes include but are not limited to alkylsilanes, alkoxysilanes, organoalkoxysilyl poly sulfides and organomercaptoalkoxysilanes. In another embodiment, said pre-silanized precipitated silica is precipitated silica pre-reacted with a silica coupler comprised of bis(3-triethoxysilylpropyl)polysulfide containing an average of from 1 to 5 connecting sulfur atoms (preferably 2 to 4) in its polysulfidic bridge or an alkoxyorganomercaptosilane. The mercaptosilane with its SH groups may improve compatibility with the rubber material or rubber matrix and/or support the curing process. Some non-limiting examples of pre-treated silicas (i.e. silicas that have been pre-surface treated with a silane) which are suitable for use in the practice of this invention include, but are not limited to, Ciptane® 255 LD and Ciptane® LP (PPG Industries) silicas that have been pre-treated with a mercaptosilane, and Coupsil® 8113 (Degussa) that is the product of the reaction between organosilane bis(triethoxysilylpropyl) polysulfide (Si69) and Ultrasil® VN3 silica, and Coupsil® 6508, Agilon® 400 silica from PPG Industries, Agilon® 454 silica from PPG Industries, and Agilon® 458 silica from PPG Industries.

In an embodiment, the rubber composition is exclusive of addition of (added) precipitated silica to the rubber composition (thereby exclusive of addition of non-pre-silanized precipitated silica).

In an embodiment, the rubber composition may include carbon black. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 to 145 g/kg and a DBP number ranging from 34 to 150 cm³/100 g. Iodine absorption values can be suitably determined according to ASTM D1510 or equivalent.

In one embodiment, the rubber composition may contain sulfur containing organosilicon compounds or silanes. Examples of suitable sulfur containing organosilicon compounds are of the formula:

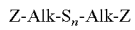 Z-Alk-S$_n$-Alk-Z        I in which Z is selected from the group consisting of

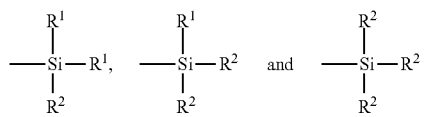

where $R^1$ is an alkyl group of 1 to 4 carbon atoms, cyclohexyl or phenyl; $R^2$ is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

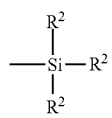

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one preferred embodiment, the sulfur containing organosilicon compounds includes 3-(octanoylthio) propyltriethoxysilane, $CH_3(CH_2)_6C(=O)—S—CH_2CH_2CH_2Si(OCH_2CH_3)_3$, which is available commercially as NXT™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa. The amount of the sulfur containing organosilicon compound in a rubber composition may vary depending on the level of other additives that are used.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively within a range of 1.5 phr to 6 phr. Typical amounts of tackifier resins, if used, comprise for example 0.5 phr to 5 phr, usually 1 phr to 5 phr. However, in a preferred embodiment the composition is free of such tackifier resins. Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e. primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

In a second aspect of the present invention, a tire is provided, the tire comprising the rubber composition of the first aspect and/or one of its embodiments.

In one embodiment the tire has a tire tread comprising the rubber composition.

In another embodiment the tire is a summer tire and/or a high performance (HP) tire. The tire may have a speed symbol (e.g. on at least one sidewall of the tire) of ZR, V, W, or Y. In other words, the tire is a high speed tire. Tire speed rating symbols as such are known to persons skilled in art.

In another embodiment, the tire of the present invention may for example be a pneumatic tire or nonpneumatic tire. The tire may also be a radial or bias tire. Preferably, the tire is a pneumatic radial tire.

In an embodiment, vulcanization of the pneumatic tire of the present invention may for instance be carried out at conventional temperatures ranging from 100° C. to 200° C. In one embodiment, the vulcanization is conducted at temperatures which are within a range of 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

It is emphasized that one or more aspects, embodiments, or features thereof, may be combined with one another within the scope of the present invention.

BRIEF DESCRIPTION OF THE DRAWINGS

The structure, operation, and advantages of the invention will become more apparent upon contemplation of the following description taken in conjunction with the accompanying drawing, wherein:

FIG. 1 is a schematic cross section of a tire comprising a tread and further rubber components.

DETAILED DESCRIPTION OF THE INVENTION

FIG. 1 is a schematic cross-section of a tire 1. The tire 1 has a tread 10, an inner liner 13, a belt structure comprising four belt plies 11, a carcass ply 9, two sidewalls 2, and two bead regions 3 comprising bead filler apexes 5 and beads 4. The example tire 1 is suitable, for example, for mounting on a rim of a vehicle, e.g. a truck or a passenger car. As shown in FIG. 1, the belt plies 11 may be covered by an overlay ply 12. The carcass ply 9 includes a pair of axially opposite end portions 6, each of which is associated with a respective one of the beads 4. Each axial end portion 6 of the carcass ply 9 may be turned up and around the respective bead 4 in a position to anchor each axial end portion 6 of the carcass ply 9. The turned-up portions 6 of the carcass ply 9 may engage the axial outer surfaces of two flippers 8 and axial inner surfaces of two chippers 7. As shown in FIG. 1, the example tread 10 may have four circumferential grooves, each groove essentially defining a U-shaped opening in the tread 10. The tread 10 comprises one or more tread compounds as described herein in accordance with various embodiments of the invention.

While the embodiment of FIG. 1 suggests a plurality of tire components including for instance apexes 5, chippers 7, flippers 8 and an overlay 12, such components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance more or less than four grooves. The present invention shall not be limited to the example of the tire 1 depicted and described in accordance with FIG. 1.

Preferred examples of a rubber composition, such as for a tire tread, which are in accordance with preferred embodiments of the invention are shown in the upper section of TABLE 1 as Inventive Examples 1 and 2 in comparison with a Comparative Example (not in accordance with the present invention).

In the lower section of TABLE 1, test results are shown for tires having one of the rubber compositions according to the Comparative Example and the Inventive Examples in the tire tread, wherein the tested tires have the same tire construction. The tire test results for rolling resistance, wet braking, and treadwear have been normalized to the respective performance of the Comparative Example.

As shown in the upper section of TABLE 1, the Inventive Examples comprise a polymer matrix based on a high glass transition temperature and solution-polymerized styrene butadiene rubber and a low glass transition temperature, solution-polymerized styrene butadiene rubber together with natural rubber, whereas the Comparative Example comprises one solution polymerized styrene butadiene rubber with a relatively high glass transition temperature in combination with a lower glass transition temperature polybutadiene and natural rubber. Moreover, the silica and silane contents of the Inventive Examples are higher than the silica content of the Comparative Example. Remarkably, the resin level of the Inventive Examples is considerably higher than the resin level in the Comparative Example.

As indicated in the lower section of TABLE 1, rolling resistance, wet braking and tread wear have been significantly improved for the Inventive Examples compared to the Comparative Example. While the values for rolling resistance and wet braking are even better for Inventive Example 2 compared to Inventive Example 1, the tread wear is significantly better in Inventive Example 1 than in Inventive Example 2. Thus, Inventive Example 1 has a good balance of said three properties with an emphasis on tread wear, whereas Inventive Example 2 has advantages over Inventive Example 1 in wet braking. Nevertheless, both Inventive Examples have an overall good balance of the three determined properties.

TABLE 1

|  | Comparative Example | Inventive Example 1 phr | Inventive Example 2 |
| --- | --- | --- | --- |
| Materials |  |  |  |
| PBD[1] | 10 | 0 | 0 |
| SBR 1[2] | 110 | 0 | 0 |
| SBR 2[3] | 0 | 70 | 53 |
| SBR 3[4] | 0 | 10 | 27 |
| NR[5] | 10 | 20 | 20 |

TABLE 1-continued

|  | Comparative Example | Inventive Example 1 phr | Inventive Example 2 |
| --- | --- | --- | --- |
| Silica[6] | 130 | 145 | 145 |
| Oil 1[7] | 4 | 0 | 0 |
| Oil 2[8] | 0 | 3 | 4 |
| Silane 1[9] | 10.5 | 14.5 | 14.5 |
| Silane 2[10] | 1 | 1 | 1 |
| Tackifyer[11] | 2 | 0 | 0 |
| Resin 1[12] | 22 | 63 | 20 |
| Resin 2[13] | 0 | 0 | 43 |
| Antidegradants[14] | 4.6 | 5.5 | 5.5 |
| Rosin | 2 | 0 | 0 |
| Waxes | 1.5 | 3 | 2 |
| Sulfur | 0.7 | 1 | 1 |
| Vulcanization agents[15] | 4.3 | 5.9 | 5.9 |
| Stearic Acid | 1 | 2.5 | 2.5 |
| Zinc soap | 2 | 2 | 2 |
| Zinc Oxide | 1 | 1.1 | 1.1 |
| Carbon black | 1 | 1 | 1 |
| Properties |  |  |  |
| Rolling Resistance [a] | 100 | 107 | 108 |
| Wet Braking [b] | 100 | 108 | 111 |
| Tread wear [c] | 100 | 122 | 117 |

[1]Polybutadiene rubber as Budene ™ 1223 from Goodyear
[2]SSBR as SLR6430 from Trinseo, including 20 phr of TDAE extension oil in the 110 phr listed here, having a Tg of about −36° C.
[3]Thio-functionalized, solution-polymerized styrene butadiene rubber as SLR3402 from Trinseo, having a Tg of −62° C.
[4]Amino silane-functionalized, solution-polymerized styrene butadiene rubber as HPR355H from JSR, having a Tg of −27° C.
[5]Natural rubber
[6]Precipitated silica as Zeosil ™ 1165 MP with a BET surface area of about 160 $m^2/g$
[7]TDAE oil
[8]Sunflower oil
[9]3-Octanoylthio-1-propyltriethoxysilane as NXT ™ from Momentive
[10]Bis-triethoxysilylpropyl tetrasulfide as SI 69 from Evonik
[11]SP 1068 from Akrochem
[12]Alpha pinene based terpene resin as Dercolyte ™ A115 from DRT
[13]C9 modified C5 resin as Oppera ™ PR 373 from Exxon Mobil
[14]P-phenylene diamines and dihydroquinolines
[15]including benzothiazolesulfenamides, diphenylguanidine, BDBzTH, N-cyclohexylthio-phthalimide
[a] Relative tire test results, normalized to the Comparative Example (higher is better)
[b] Relative tire test results, normalized to the Comparative Example (higher is better)
[c] Relative tire test results, normalized to the Comparative Example (higher is better)

While certain representative embodiments, examples and details have been shown for the purpose of illustrating the subject invention, it will be apparent to those skilled in this art that various changes and modifications can be made therein without departing from the scope of the invention. It is, therefore, to be understood that changes may be made in the particular example embodiments described which will be within scope of the invention as defined by the following appended claims. In any case, the above described embodiments and examples shall not be understood in a limiting sense.

The invention claimed is:

1. A rubber composition comprising:
   70 phr to 95 phr of styrene butadiene rubber comprising at least 5 phr of a first styrene butadiene rubber having a glass transition temperature determined as a peak midpoint by differential scanning calorimeter (DSC) at a temperature rate of increase of 10° C. per minute according to ASTM D3418 within a range of −49° C. to −15° C. and at least 45 phr of a second styrene butadiene rubber having a glass transition temperature within a range of −50° C. to −75° C., wherein the rubber composition comprises more of the second styrene butadiene rubber than of the first styrene butadiene rubber;
   5 phr to 30 phr of at least one member selected from the group consisting of natural rubber and synthetic polyisoprene rubber;
   more than 150 but less than 200 phr of filler including both silica and coupling agent; and
   at least 55 phr of at least one hydrocarbon resin comprising at least one terpene resin which has a glass transition temperature of at least 30° C.; and,
   optionally 1 phr to 4 phr of oil.

2. The rubber composition according to claim 1, wherein the rubber composition comprises at least 60 phr of the at least one hydrocarbon resin.

3. The rubber composition according to claim 1, wherein the terpene resin is an alpha pinene based terpene resin.

4. The rubber composition according to claim 1, wherein said terpene resin has one or more of: i) a softening point within a range of 100° C. to 150°; ii) a glass transition temperature within a range of 35° C. and 90° C.; and iii) a weight average molecular weight Mw within a range of 500 g/mol to 1000 g/mol.

5. The rubber composition according to claim 1, wherein the terpene resin is one or more of i) non-hydrogenated, and ii) free of aromatic modifications.

6. The rubber composition according to claim 1, wherein the first and the second styrene butadiene rubbers are solution polymerized styrene butadiene rubbers.

7. The rubber composition according to claim 1, wherein the second styrene butadiene rubber has a glass transition temperature higher than −70° C.

8. The rubber composition according to claim 1, wherein the silica has a BET surface area within a range of 150 $m^2/g$ to 220 $m^2/g$.

9. The rubber composition according to claim 1, further comprising one or more of:
   from 0.1 phr to 10 phr of carbon black;
   from 10 phr to 20 phr of silane;
   from 10 phr to 20 phr of a blocked mercapto silane; and
   from 1 phr to 9 phr of liquid plasticizers.

10. The rubber composition according to claim 1, further comprising from 8 phf to 15 phf of a blocked mercapto silane.

11. The rubber composition according to claim 1, wherein one or both of the first styrene butadiene rubber and the second styrene butadiene rubber comprise at least one functional group configured for coupling to the silica.

12. The rubber composition according to claim 1, wherein one of the first styrene butadiene rubber and the second styrene butadiene rubber is end chain functionalized with an amino silane group on at least one of its ends, and wherein the other one of the first styrene butadiene rubber and the second styrene butadiene rubber is end chain functionalized on at least one of its ends with an amino siloxane group.

13. The rubber composition according to claim 1, wherein the first styrene butadiene rubber has a glass transition temperature within a range of −20° C. to −40° C. and the second styrene butadiene rubber has a glass transition temperature within a range of −55° C. and −69° C.

14. The rubber composition according to claim 1, wherein the glass transition temperature of the rubber composition is within a range of −25° C. and −15° C.

15. A tire comprising the rubber composition according to claim 1.

16. The tire according to claim 15, wherein the tire comprises a tread including said rubber composition.

17. The tire according to claim 15, wherein the tire is a summer tire.

18. The tire according to claim 15, wherein the tire has a speed symbol selected from W and Y.

\* \* \* \* \*